United States Patent
Dürr

(10) Patent No.: US 9,180,536 B2
(45) Date of Patent: Nov. 10, 2015

(54) DEVICE AND METHOD FOR MACHINING BEVEL GEARS USING AN ECCENTRICALLY MOVED GRINDING TOOL

(71) Applicant: Klingelnberg AG, Zürich (CH)

(72) Inventor: Alexander Dürr, Saline, MI (US)

(73) Assignee: Klingelnberg AG, Zurich (CH)

( * ) Notice: Subject to any disclaimer, the term of this patent is extended or adjusted under 35 U.S.C. 154(b) by 402 days.

(21) Appl. No.: 13/855,618

(22) Filed: Apr. 2, 2013

(65) Prior Publication Data

US 2013/0260643 A1 Oct. 3, 2013

(30) Foreign Application Priority Data

Apr. 2, 2012 (EP) ..................... 12162872

(51) Int. Cl.
*B23F 23/00* (2006.01)
*B23F 1/02* (2006.01)
*B23F 9/02* (2006.01)

(52) U.S. Cl.
CPC ................. *B23F 23/006* (2013.01); *B23F 1/02* (2013.01); *B23F 9/025* (2013.01)

(58) Field of Classification Search
CPC ............ B23F 17/006; B23F 1/02; B24B 1/04
USPC ......... 451/5, 11, 47, 121, 147, 159, 211, 219, 451/253, 291
See application file for complete search history.

(56) References Cited

U.S. PATENT DOCUMENTS

| | | | | | |
|---|---|---|---|---|---|
| 2,325,836 | A | * | 8/1943 | Drummond | 451/121 |
| 4,920,703 | A | * | 5/1990 | Hosoya | 451/47 |
| 5,539,172 | A | * | 7/1996 | Takase et al. | 219/69.2 |
| 6,174,223 | B1 | * | 1/2001 | Miyamae et al. | 451/47 |
| 7,462,092 | B2 | * | 12/2008 | Stadtfeld et al. | 451/11 |

FOREIGN PATENT DOCUMENTS

DE 24 45 483 4/1976
DE 27 21 164 A1 11/1978

OTHER PUBLICATIONS

Stadtfeld, Dr. Hermann J., "Guidelines for Modern Bevel Gear Grinding", revised May 2008, pp. 14 and 15, The Gleason Works, Rochester, NY, USA.

* cited by examiner

*Primary Examiner* — Maurina Rachuba
(74) *Attorney, Agent, or Firm* — McCarter & English, LLP

(57) ABSTRACT

A device has a work piece spindle for accommodating a bevel gear work piece, a tool spindle for accommodating a grinding wheel having an abrasive surface, and a plurality of drives for machining the bevel gear work piece. During machining of the bevel gear work piece, the grinding wheel rotates about the rotational axis of the tool spindle and engages the bevel gear work piece to remove material. The rotation is superimposed with an eccentric movement such that the grinding wheel only engages the bevel gear work piece at n contact regions of the abrasive surface. The device is configured to allow adjustment of the eccentric movement after a first machining phase and to specify m contact regions of the abrasive surface in a further machining pase, wherein the m contact regions do not overlap with the n contact regions.

18 Claims, 6 Drawing Sheets

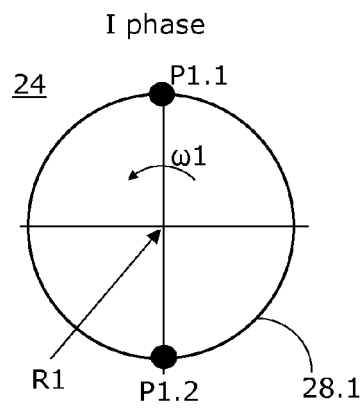
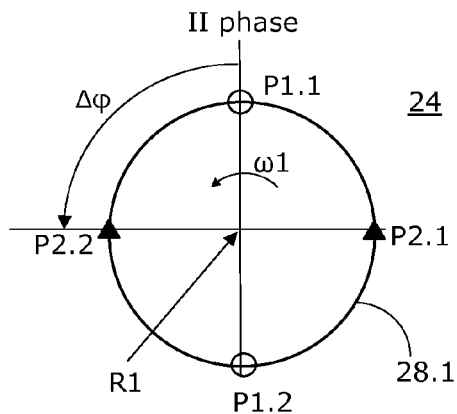
Fig. 4A  Fig. 4B
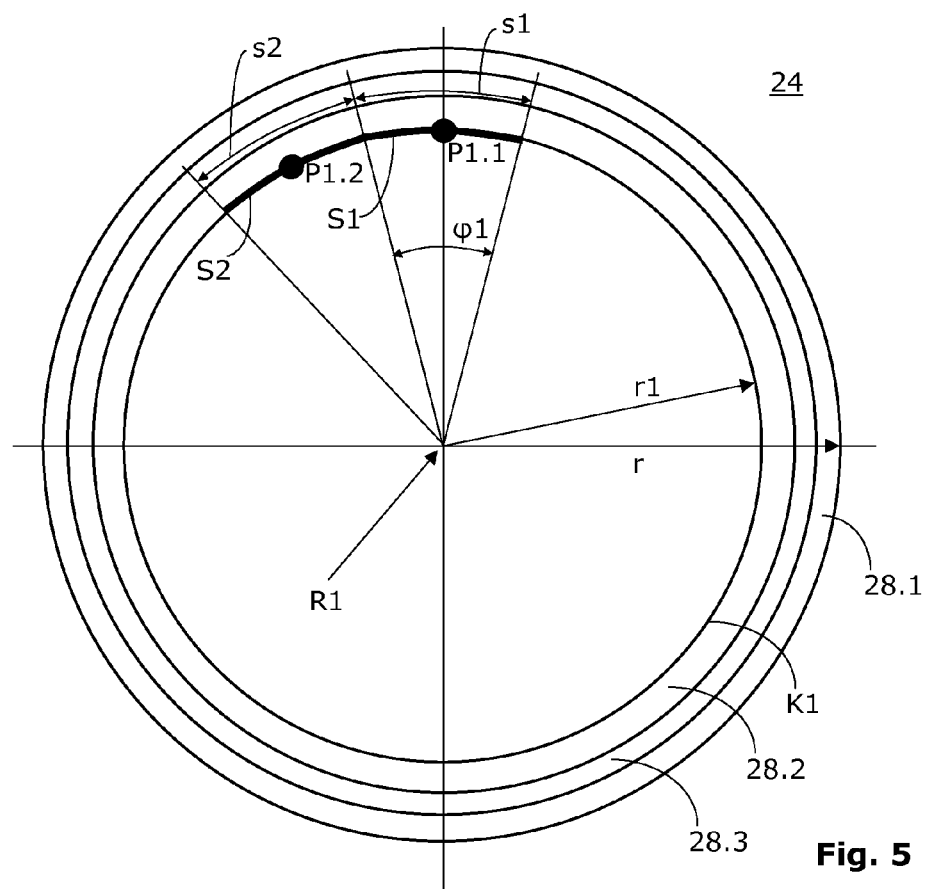
Fig. 5

DEVICE AND METHOD FOR MACHINING BEVEL GEARS USING AN ECCENTRICALLY MOVED GRINDING TOOL

CROSS-REFERENCE TO RELATED APPLICATIONS

This application claims priority under 35 U.S.C. §119(a)-(d) to European Patent Application No. EP 12 162 872.1, filed Apr. 2, 2012, which is hereby incorporated by reference in its entirety as part of the present disclosure as if fully set forth herein.

FIELD OF THE INVENTION

The invention relates to devices for machining bevel gears using a grinding tool that is eccentrically moved.

BACKGROUND OF THE INVENTION

It is known that bevel gears can be machined using a grinding tool. So-called cup grinding wheels are frequently used in this case.

So-called discontinuous profile grinding is a grinding process according to the single indexing method. In particular, discontinuous profile grinding is used to manufacture plunged crown wheels. During the plunging of the cup grinding wheel, the profile of the cup grinding wheel is imaged in the material of the crown wheel to be manufactured. The corresponding method is also designated as the index forming method.

During the grinding of spiral-toothed bevel gears, the concave tooth flank of one tooth gap is produced using the outer peripheral surface and the convex tooth flank of the tooth gap is produced using the inner peripheral surface of the cup grinding wheel. If this is performed in two-flank cutting, also called completing, which is typical in the case of plunge grinding of crown wheels, both tooth flanks of the tooth gap are ground simultaneously. In one-flank grinding, in contrast, either only the concave tooth flanks or only the convex tooth flanks of the tooth gap are ground.

A large contact surface over the entire tooth width of the work piece results in this case in the plunge grinding of spiral bevel gears. Coolant liquid cannot reach the grinding zone here. Because of the large contact surface and the poor cooling, so-called grinding burn can occur on the tooth flanks of the work piece. In addition, problems can occur in the chip removal and the cup grinding wheel can clog with metal particles.

It is known that the plunging movement of the grinding wheel can have an eccentric auxiliary movement of the grinding wheel center point superimposed, in order to thus remedy the mentioned problems or to reduce their influence on the grinding process. Due to the mentioned superposition, the cup grinding wheel center point moves on an orbit around a center point. The radius of this orbit is designated as the eccentric stroke and is small in comparison to the radius of the cup grinding wheel. Because of this movement, the cup grinding wheel will only contact the work piece in one point, considered geometrically; in reality, however, it is a locally delimited region in which the contact occurs, because of the feed movement. The ratio of the eccentric speed to the speed of the cup grinding wheel is the so-called eccentric ratio.

The eccentric auxiliary movement can be produced in grinding machines by setting the eccentric ratio, or the eccentric speed, respectively, in the form of a fixed specification.

An undesirably large surface contact between the grinding disc and the crown wheel can be avoided by the eccentric movement. Details on the superposition of a cyclic eccentric movement can be inferred, for example, from German patent application publications DE 2721164 A and DE 2445483 A. The principle of the eccentric movement originates from the inventor Waguri, who made corresponding developments in the year 1967.

FIG. 1A shows a schematic illustration of the so-called Waguri approach, in which a cup grinding wheel 2 rotates around a wheel center point M1, which is offset relative to the center point M2 of a Waguri wheel 3 by a small distance e (referred to as the Waguri eccentricity). The eccentric ratio is defined as the speed of the eccentric divided by the speed of the cup grinding wheel 2. The cup grinding wheel 2 rotates at the angular velocity $\omega 1$ around the center point M1. The eccentric movement causes a circular movement around M2 for the center point M1 of the cup grinding wheel 2. This circular movement has movement components in the x direction and in the y direction.

In the case of otherwise constant ratios, the frequency of the contact of the cup grinding wheel 2 with the tooth flank, the location of this contact region on the cup grinding wheel 2, and the phasing of the contact of concave and convex tooth flanks in the case of two-flank cutting and the possible displacement thereof on the cup grinding wheel 2 are dependent on the selected eccentric ratio.

For example, if one presumes that in the case of an eccentric rotational angle of 0° (the 0° position is coincident with the y axis here), the contact between the cup grinding wheel 2 and the concave flank 5.1 of a tooth gap 5 occurs in the region 4 (see FIG. 1A), thus, after a rotation of the eccentric by 180°, the contact between the cup grinding wheel 2 and the convex flank (in FIG. 1A, the convex flank of the next tooth gap is identified by the reference sign 5.2) of the tooth gap 5 will occur.

If the eccentric ratio is 1, the eccentric rotates once during one revolution of the cup grinding wheel 2. The cup grinding wheel 2 contacts the concave flank 5.1 of the tooth gap 5 (at) 0° once and the convex flank of the tooth gap 5 (at 180°) once during each full revolution. The contact always occurs in the same region. If the eccentric ratio is 2, two contacts of the cup grinding wheel 2 with the concave flank 5.1 of the tooth 5 (at 0° and 180°) or with the convex flank of the tooth 5 (at 90° and 270°), respectively, thus occur during one full revolution of the cup grinding wheel 2. At an eccentric ratio of 0.5, the concave flank 5.1 is contacted at 0° and 720° and the convex flank is contacted at 360° and 1080°. These degree specifications respectively relate to a fixed coordinate system of the cup grinding wheel 2 and in the mentioned three special cases, there is no shift of the contact regions along the grinding wheel periphery from full revolution to full revolution of the cup grinding wheel 2.

In general, however, a shift of the contact region on the cup grinding wheel 2 occurs per full revolution, so that the entire grinding wheel periphery is used for the grinding machining of the work piece 1. The eccentric ratio which is predefined can also be a rational number Q. A practical example is an eccentric ratio of 0.7. In this case, the contact of the concave flank 5.1 would occur at 0° and 514.2857° (corresponding to 154.2857° on the grinding wheel periphery) and that of the convex flank at 257.1428° and 771.4286° (corresponding to 51.4286° on the grinding wheel periphery). If the cup grinding wheel 2 executes a plurality of full revolutions, the contact regions are displaced further and further and finally the entire grinding wheel periphery on the profile 8 is used for the grinding machining.

FIG. 1B shows a section along reference line X1-X1 through a part of the cup grinding wheel 2. The profile 8 of the cup grinding wheel 2 can be recognized in FIG. 1B.

Due to the superimposed eccentric movement, an (excessively) large surface contact between the outer periphery 8.1 of the profile 8 of the cup grinding wheel 2 and the entire surface of the concave flank 5.1 of the work piece 1 and the inner periphery 8.2 of the profile 8 of the cup grinding wheel 2 and the entire surface of the convex flank is avoided.

Details on a grinding method having superimposed eccentric movement are described, for example, in the document "Guidelines for Modern Bevel Gear Grinding", H. J. Stadtfeld, revised May 2008, The Gleason Works, USA, on pages 14 and 15.

Grinding wheels are referred to in general hereafter, although in the concrete case these are mostly cup grinding wheels.

Studies have shown that grinding burn can nonetheless form on grinding wheels that are eccentrically mounted according to the Waguri approach. In addition, these eccentrically mounted grinding wheels can still also be clogged with metal residues. In addition, these grinding wheels can have an inadequate service life.

SUMMARY OF THE INVENTION

It is an object of the present invention to provide a bevel gear machining approach that will improve the service life of such eccentrically mounted grinding wheels.

In one aspect, a device is used that is equipped with a work piece spindle for accommodating a bevel gear work piece (e.g., a spiral bevel gear work piece), a tool spindle for accommodating a grinding wheel, and a plurality of drives for machining the bevel gear work piece. The grinding wheel executes a rotation around the rotational axis of the tool spindle and the grinding wheel engages the bevel gear work piece in order to remove material during the machining of the bevel gear work piece. The rotation around the rotational axis of the tool spindle is superimposed with an eccentric movement, so that the grinding wheel does not continuously remove material along the entire concave and/or convex flanks using its outer and/or inner abrasive surface, but rather engages the bevel gear work piece intermittently and only at a number n {where n∈ $\mathbb{Q}$ } of contact points of a full circle of the abrasive surfaces.

The device is configured to allow an adjustment of the eccentric movement, in order, after a first machining phase, to specify a number m {where m∈ $\mathbb{Q}$ } of contact points of the full circle of the abrasive surfaces of the grinding wheel in the scope of a further machining phase, wherein the m contact points differ from the n contact points by an angular distance. The following condition typically applies: m=n.

The angular distance relates to the grinding wheel, i.e., the angular distance is established in the coordinate system of the grinding wheel. The coordinate system of the grinding wheel is fixedly connected to the grinding wheel and rotates with it around the rotational axis of the grinding wheel. The establishment of the n and m contact points also relates to the grinding wheel.

When so-called contact points are referred to here, it is to be considered that the contact points are geometric values, which result from a theoretical computational observation. In practice, the contacts between grinding wheel and work piece occur in so-called contact regions, which are defined by the respective contact points, however.

The angular distance is selected such that an angular (uniform) distribution of all contact regions successively occurs over the full circle of the abrasive outer and inner surfaces of the grinding wheel. That is, the (uniform) distribution of all contact regions is fixedly connected to the grinding wheel.

To be able to perform monitoring of the angular uniform distribution, the respective angle (stroke angle), at which the grinding wheel comes into contact with the material of the bevel gear work piece is fixed in relation to the grinding wheel. In other words, different stroke points are established in relation to the grinding wheel during a first machining phase than in a further machining phase.

BRIEF DESCRIPTION OF THE DRAWINGS

FIG. 4A is a schematic plan view of an eccentrically mounted grinding wheel in a first machining phase of one-flank cutting, which comes into contact with the material of a work piece to be machined at two fixed (stroke) points per full revolution;

FIG. 4B is a schematic plan view of the grinding wheel of FIG. 4A, which in a second machining phase of one-flank cutting comes into contact with the material of a work piece to be machined at two other fixed (stroke) points per full revolution;

FIG. 5 is a schematic front view of the cup side of an eccentrically mounted grinding wheel, which is subdivided into a plurality of circular segments, wherein each circular segment has a (stroke) point;

DETAILED DESCRIPTION OF EMBODIMENTS OF THE INVENTION

Terms are used in the context of the present description which are also used in relevant publications and patents. However, it is to be noted that the use of these terms is only to serve for better understanding. The ideas of the invention and the scope of protection of the patent claims are not to be restricted in their interpretation by the specific selection of the terms. The invention may be readily transferred to other term systems and/or technical fields. The terms are to be applied accordingly in other technical fields.

Figure 2:
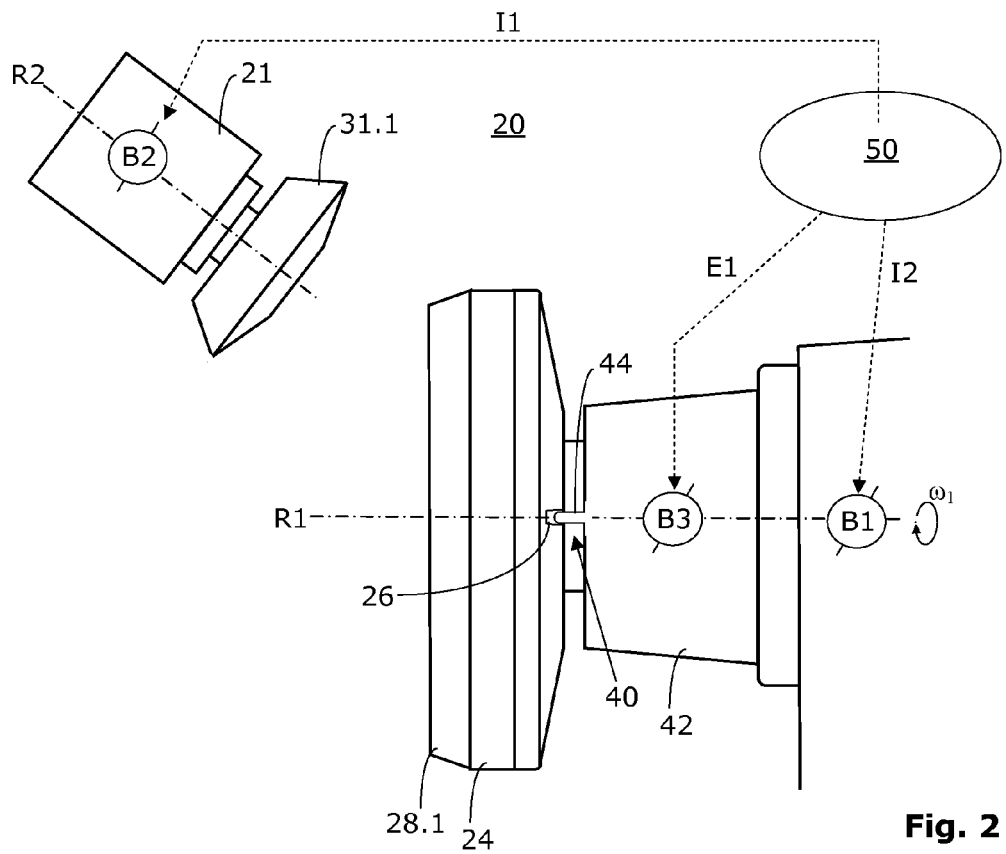
FIG. 2 is a schematic side view of a part of a grinding machine having a cup grinding wheel, which is mounted so it is rotatable on a tool spindle, and having a bevel gear work piece to be machined, which is mounted so it is rotatable on a work piece spindle, wherein the cup grinding wheel and the bevel gear work piece are not engaged.
Figure 3:
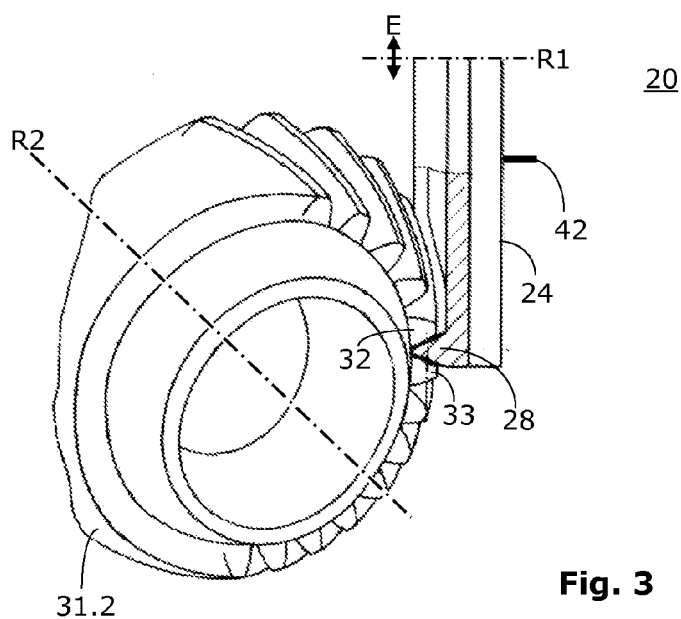
FIG. 3 is a schematic perspective view of a part of the grinding machine of FIG. 2 having a cup grinding wheel in partial section, which is mounted so it is rotatable on a tool spindle, engaged with a bevel gear work piece (a spiral-toothed pinion here), which is mounted so it is rotatable on a work piece spindle, wherein the cup grinding wheel and the bevel gear work piece.

A device 20 comprises, as shown in FIGS. 2 and 3, a work piece spindle 21 and a bevel gear work piece 31 (e.g., a stylized crown wheel 31.1) operatively connected thereto. The device 20 further comprises a tool spindle 42 operatively connected to a grinding wheel 24 (e.g., a cup grinding wheel) and a plurality of drives (e.g., B1, B2, B3 and further drives, which are not shown in the figures) for machining the bevel gear work piece 31. The grinding wheel 24 executes a rotation at an angular velocity $\omega 1$ around the rotational axis R1 of the tool spindle 42 during machining of the bevel gear work piece 31. The grinding wheel 24 engages the bevel gear work piece 31, as shown in FIG. 3, on the basis of a spiral-toothed pinion 31.2, in order to remove material. The rotation around the rotational axis R1 is superimposed with an eccentric movement, so that the grinding wheel 24 does not remove material uninterruptedly using its abrasive outer surface and/or inner surface. In some embodiments, the grinding wheel 24 only engages the bevel gear work piece 31 at n contact points (called stroke points) of a full circle of the abrasive outer surface and/or inner surface of the grinding wheel 24, in order to remove material therein in the contact regions.

Figures 1A, 1B:
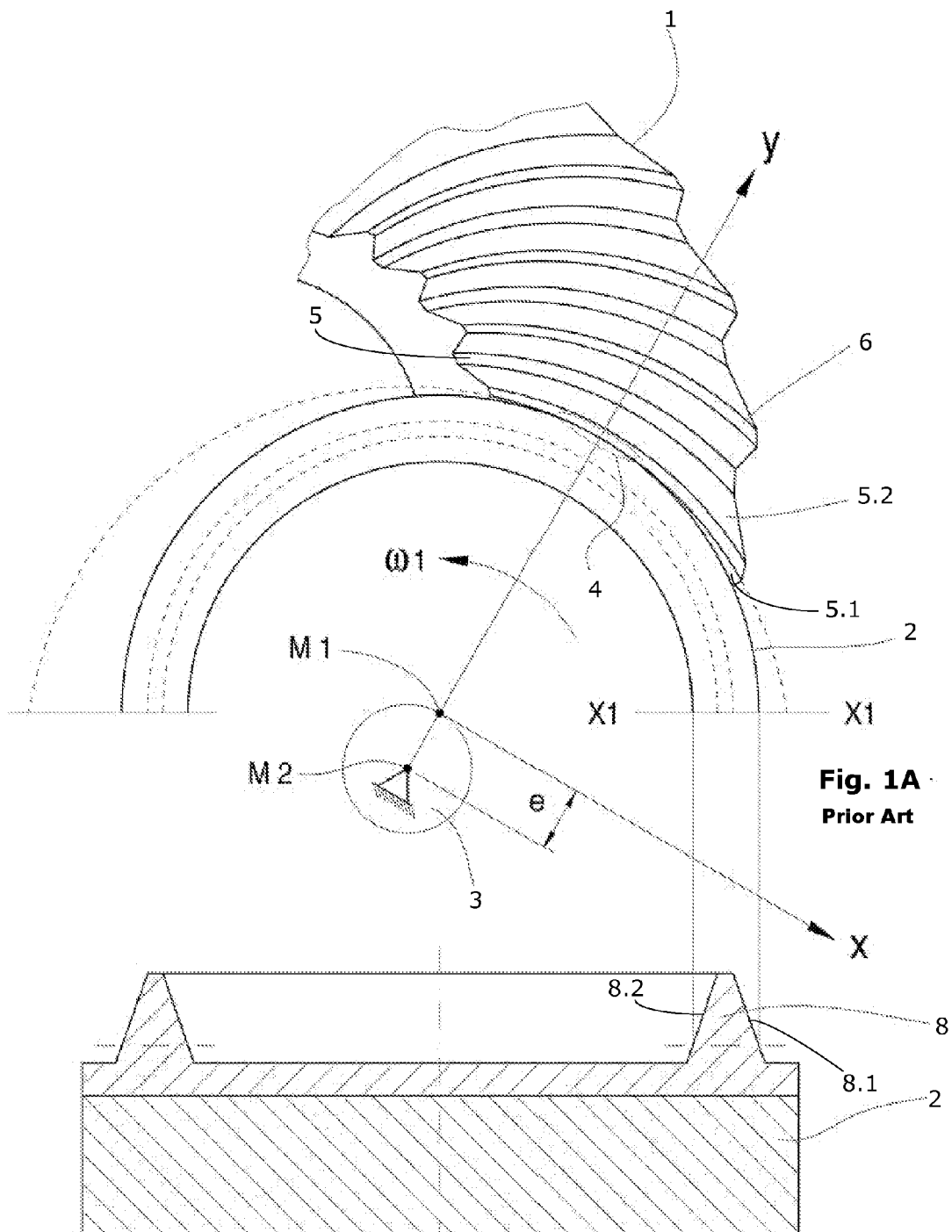
FIG. 1A is a schematic front view of a cup grinding wheel, eccentrically mounted on a Waguri wheel for machining a tooth gap of a crown wheel work piece according to the prior art Waguri method.
FIG. 1B is a schematic sectional view of the cup grinding wheel of FIG. 1A along line X1-X1.

In FIG. 3, the eccentric movement E is schematically shown by a double arrow. In principle, the rotational axis R1 is moved slightly up-and-down in the axial section of the cup grinding wheel 24 by the superimposed circular eccentric movement E. Considered in three dimensions, the cup grinding wheel 24 completes an eccentric movement along a small orbit, as indicated in FIG. 1A and described in conjunction with this FIG., for example.

FIGS. 2 and 3 show a cup-shaped grinding wheel 24 (called a cup grinding wheel), on whose profile 28 an annular peripheral outer surface 28.1 and an annular peripheral inner surface 28.2 are provided. In FIG. 3, the annular peripheral outer surface 28.1 machines the concave tooth flank of the tooth 33 and the annular peripheral inner surface 28.2 machines the convex tooth flank of the tooth 32 of a pinion work piece 31.2.

Figure 9:
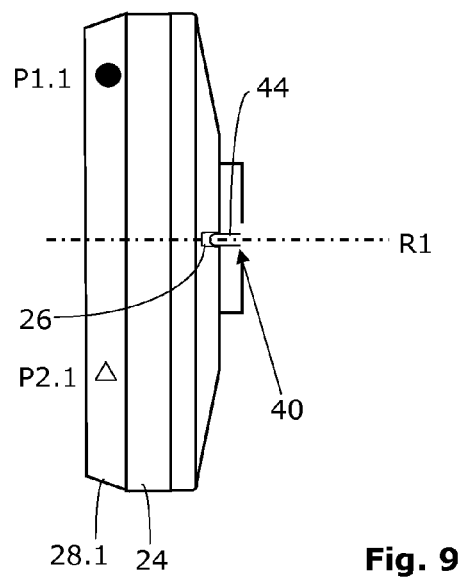
FIG. 9 is a schematic side view of an eccentrically mounted cup grinding wheel, which is used in one-flank cutting and has a plurality of contact points on the outer periphery of the profile, where two of the contact points are visible.

For the sake of simplicity, the principle of the invention is explained in the following figures on the basis of grinding wheels 24, which are used either for the one-flank cutting of concave tooth flanks or for the one-flank cutting of convex tooth flanks. The contact points or the corresponding contact regions lie either on the annular peripheral outer surface 28.1 or on the annular peripheral inner surface 28.2 of the grinding wheel 24, i.e., the contact points or contact regions lie either on the outside or inside of the profile 28. FIG. 9 shows an example in which the contact points or contact regions lie on the annular peripheral outer surface 28.1.

In the case of grinding wheels 24 which are used in two-flank cutting, the contact regions lie both on the outer surface 28.1 and also on the inner surface 28.2, wherein the contact regions of the outer surface 28.1 are angularly twisted in relation to the contact regions of the inner surface 28.2.

The following rules apply in this case:

At an eccentric ratio EV which is 1, and in the case of one-flank cutting, there is only one contact on the outer surface 28.1 or on the inner surface 28.2;

At an eccentric ratio EV which is 1, in the case of two-flank cutting, there is only one contact on the outer surface 28.1 and on the inner surface 28.2, wherein the contact points are angularly twisted by 180°;

At an eccentric ratio EV which is 2, in the case of one-flank cutting, there are only two contacts on the outer surface 28.1 or on the inner surface 28.2;

At an eccentric ratio EV which is 2, in the case of two-flank cutting, there are two contacts on the outer surface 28.1 and two on the inner surface 28.2, wherein the contact points are angularly twisted by 90°. The contact points of the outer surface 28.1 are at 0° and 180°, for example, and the contact points of the inner surface 28.2 are at 90° and 270°, for example.

This rule may be generalized as follows:

In the case of one-flank cutting, the eccentric ratio EV specifies in principle the number of contact points of the outer surface 28.1 or the inner surface 28.2 per full revolution. More precisely, the eccentric ratio EV is an average value of the number of the cuts per revolution or simply the ratio of the cuts to the revolution;

In the case of two-flank cutting, the eccentric ratio EV directly specifies the number of contact points of the outer surface 28.1 and the inner surface 28.2 per full revolution, wherein the contact points of the outer surface 28.1 are angularly twisted to one another by 360°/2*EV in relation to the contact points of the inner surface 28.2. A contact point of the inner surface 28.2 is always followed by a contact point of the outer surface 28.1, etc.

During machining, the grinding wheel 24 and the bevel gear work piece 31 are engaged with one another, as shown in FIG. 3, for example. In the case of crown wheels 31.1 (see FIG. 2), the grinding wheel 24 is plunged into the bevel gear work piece 31. In the case of pinions 31.2 (see FIG. 3), the grinding wheel 24 and the bevel gear work piece 31.2 roll with one another.

Such an approach is known, for example, from German published patent application DE 2721164 A. The tooth profiles of the teeth 32, 33 are produced on the bevel gear work piece 31.2 by a known rolling process. In the example shown, the right flank and left flank of a tooth gap are machined by grinding simultaneously in two-flank cutting. FIG. 3 shows how a tooth gap is machined between the teeth 32, 33 of the bevel gear work piece 31.2. The profile region 28 of the grinding wheel 24 that engages the tooth gaps, defines the tooth shape in the tooth longitudinal direction. The cutting movement of the grinding wheel 24 relative to the material of the bevel gear work piece 31.2 results in a known manner in the removal of material.

The described rotational movement is superimposed with an eccentric movement E, as described in conjunction with FIGS. 1, 2, and 3. This eccentric movement E can be seen in FIG. 3 (projected in the plane of the drawing). In some embodiments, the rotational movement including the eccentric movement E and any possible other movements are controlled by a CNC controller 50 (see FIG. 2), such that no mechanical movement control/coordination is necessary. The arrows I1 and I2 indicate the control connections of the CNC controller 50 to the drive motors B1, B2 of the device 20. In addition, depending on the situation and phase of the machining, there can be further movements of the axes of the device 20 (not shown).

The eccentric movement can be superimposed at a precise angle with the rotational movement ω1 of the grinding wheel 24 by the CNC controller 50. It is schematically indicated in FIG. 2 by an arrow E1, which leads from the CNC controller 50 to the tool spindle 42, such that the CNC controller 50 can emit an eccentric signal E1, for example, to control the eccentric movement by acting on an eccentric drive B3 of the tool spindle 42.

Without the superimposed eccentric movement E, the outer and/or inner grinding flanks (called the outer surfaces 28.1 and inner surfaces 28.2) of the grinding wheel 24 (the cup-shaped grinding wheel here) would be engaged in the peripheral direction along a circular arc segment with the work piece 31. The grinding burn hazard on the work piece 31 would therefore be high, as described above, so that one could only work with a reduced infeed, for example.

The device 20 is configured such that an adjustment of the eccentric movement E is possible. After a first machining phase (I phase, see FIG. 4A, for example), which is defined by n contact points of the full circle, m contact points of the full circle of the abrasive surface(s) in the scope of a further machining phase (II phase, see FIG. 4B, for example) can be predefined. The m contact points differ from the n contact points by an angular distance Δϕ, which relates to the grinding wheel 24, i.e., the m contact points are angularly twisted in relation to the n contact points by the angular distance Δϕ.

This principle will be explained hereafter on the basis of FIGS. 4A and 4B. Grinding wheels 24 are shown here, which are used in one-flank cutting. Of the grinding wheel 24, only the outer surface 28.1 is shown by a circle. The grinding wheel 24 is connected at a fixedly specified angle to the tool spindle 42. A positioning element 44 is usable here, which is arranged on the tool spindle 42, for example, and engages in a recess 26 of the grinding wheel 24, as shown in FIG. 2. The positioning element 44 is configured such that the grinding wheel 24 is connected at a fixed angle in a twist-locked manner to the tool spindle 42.

The eccentricity is now predefined (for example, by specifying the eccentric ratio EV =2) for the first machining phase (I phase, see, for example, FIG. 4A) such that the grinding wheel 24 only contacts the work piece 31 at the positions 0° (corresponding to the 12 o'clock position) and 180° (corresponding to the 6 o'clock position) of the grinding wheel 24. In the case of one-flank cutting, EV=2 corresponds to two contacts either of the outer surface 28.1 per full revolution or the inner surface 28.2 per full revolution. These contact points (stroke points), which are fixed in relation to the grinding wheel 24, are identified in FIG. 4A with P1.1 and P1.2. The active contact points P1.1 and P1.2 are indicated in FIG. 4A by solid black circles. After the first machining phase is complete, the grinding wheel 24 (directly or after a period of time) is used in a further machining phase, as shown in FIG. 4B, for example. In order to prevent the grinding wheel 24 from being actively stressed again at the same contact points P1.1 and P1.2 in the further machining phase, new (different) active contact points P2.1 and P2.2 are specified. These active contact points P2.1 and P2.2 are indicated in FIG. 4B by solid black triangles. The contact points P1.1 and P1.2 (called inactive contact points), which were previously used, are indicated in FIG. 4B by solid white circles. In the example shown in FIGS. 4A and 4B, active contact points P1.1 and P1.2 are used in the first machining phase n=2, while active contact points P2.1 and P2.2 are used in the second machining phase m=2. The angular distance Δϕ is 90° here.

In principle, there are two possibilities for how the adjustment of the angular distance Δϕ of the stroke movement can be performed in a grinding machine (device 20). If the eccentricity is fixedly settable in relation to the tool spindle 42, then in the example according to FIG. 4A, the tool spindle 42 would specify n=2 active stroke points at the positions 0° and 180° of the tool spindle 42. If the grinding wheel 24 is connected in a rotationally-fixed manner to the tool spindle 42 (for example, by the positioning element 44, which engages in the recess 26), the contact points P1.1 and P1.2 corresponding to the stroke points are at the positions 0° and 180° of the grinding wheel 24, as shown in FIG. 4A. If the eccentricity in the second machining phase is again specified fixedly in relation to the tool spindle 42 at the positions 0° and 180° of the tool spindle 42 (i.e., the active stroke points are again at 0° and 180°), the grinding wheel 24 can be twisted by the angular distance Δϕ=90° in relation to the tool spindle 42 before the second machining phase. The grinding wheel 24 can be disconnected from the tool spindle 42, in order to be twisted 90° and fastened again. A further recess 26 can be provided on the tool spindle 42, for example, to be able to chuck the grinding wheel 24 on the tool spindle 42 twisted by 90°. After such a 90° twist, the active contact points P2.1 and P2.2 of the grinding wheel 24 are coincident with the active stroke points of the tool spindle 42 at 0° and 180°. This approach is complex and is not suitable or only has limited suitability for an automated device 20. In addition, in this case the positioning element 44 and/or the recess(es) 26 can be designed such that a step-by-step (for example, indexed) twisting and fastening of the grinding wheel 24 on the tool spindle 42 is possible.

In one aspect of the invention, it is not necessary to disconnect the grinding wheel 24 from the tool spindle 42 in order to adjust the angular distance Δϕ. The eccentric movement, as the cyclic rotational movement, is thus superimposed on the main rotation (also called the revolving movement) of the grinding wheel 24 around the rotational axis R1, such that the contact, i.e., the removal of material, respectively occurs at precisely predefined angular positions. The cyclic rotational movement is considered to be a circular movement around an eccentric axis. The eccentric axis is perpendicular to the plane of the drawing in FIG. 1A and penetrates the point M2. The eccentric axis runs parallel to the rotational axis R1. In some embodiments, the distance e is between 0.05 mm and 1 mm. In some such embodiments the distance e is between 0.05 mm and 0.5 m.

The eccentric movement is quasi-synchronized or fixed in relation to the grinding wheel 24, i.e., the CNC controller 50 "knows" if, for example, the contact point P1.1 of the grinding wheel 24 is located in the upper, spatially-fixed 12 o'clock position. In concrete implementations of the invention, the two speeds and angular positions (grinding wheel, eccentric) are synchronized in accordance with the eccentric ratio EV, wherein a speed is the reference variable. The speeds and the angular position are tapped via rotational encoders. If an offset from 1 to 2 is to be achieved, an offset is applied to the rotation of the eccentric drive and the speeds are again kept constant thereafter.

In the example shown in FIG. 4A, in one embodiment, for example, the CNC controller 50 outputs an eccentric signal E1 if the contact point P1.1 or the contact point P1.2 of the grinding wheel 24 is located in the upper, spatially-fixed 12 o'clock position. The grinding wheel 24 thus makes EV=n=2 eccentric movements per full revolution of the grinding wheel 24. In the example shown in FIG. 4B, for example, the CNC controller 50 outputs an eccentric signal E1 if the contact point P2.1 or the contact point P2.2 of the grinding wheel 24 is located in the upper, spatially-fixed 12 o'clock position. At these moments, the contact point P1.1, which was previously active during the I phase, is in the spatially-fixed 9 o'clock position or in the spatially-fixed 3 o'clock position, respectively. At these moments, the contact point P1.2, which was previously active during the I phase, is in the spatially-fixed 3 o'clock position or in the spatially-fixed 9 o'clock position, respectively. The inactive contact point P1.1 leads the now active contact point P2.1 by 90° and the inactive contact point P1.2 follows the now active contact point P2.2 by 90°. The grinding wheel 24 makes EV=m=2 eccentric movements per full revolution of the grinding wheel 24 in the II phase.

In some embodiments, the zero point (i.e., the zero position) can be specified at a (angle) subdivision. In the exemplary embodiments of FIGS. 4A, 4B, and shown hereafter, the zero point is established at the upper, spatially-fixed 12 o'clock position. Depending on the application, this zero point can also lie at any other angular position.

In some embodiments, the zero point lies at the angular position which is established by the interlocking of corresponding operational means of the device 20. In the examples according to FIGS. 2 and 9, the positioning element 44 and the recess 26 are used as the corresponding operational means.

Figure 10:
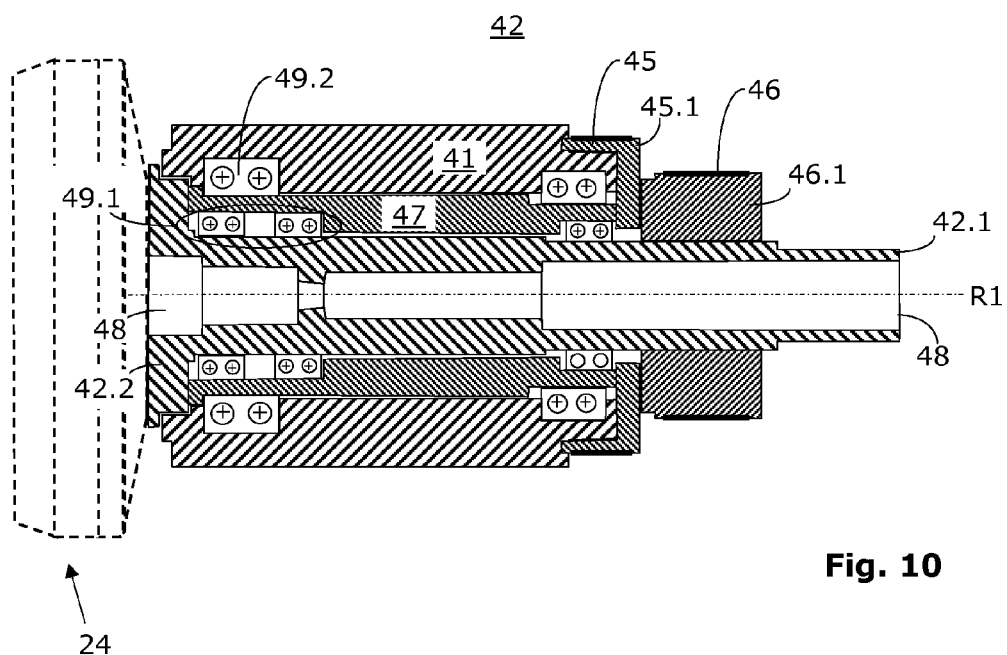
FIG. 10 is a schematic side sectional view of an tool spindle to which is attached a cup grinding wheel, which can be driven via two belts and belt pulleys.

In some embodiments, two CNC-controlled drives B1 and B3 are used, in order to generate the rotation around the rotational axis R1 and the auxiliary movement (eccentric movement) synchronized thereto. The following configurations result, which can be selected depending on the required precision, structural form, and performance of the device 20:

a) Two coaxially arranged drives B1 and B3 are used, which are both controlled by the CNC controller 50. Each of these drives has an angle decoder, which can be read out by the CNC controller 50 or which transmits signals via the current angular position and/or speed to the CNC controller 50. The two drives B1 and B3 are arranged coaxially nested. Since the two drives B1 and B3 are arranged coaxially in or on the tool spindle 42, this configuration has a relatively large moving mass, which can be accelerated during the execution of the eccentric movement.

b) Two drives B1 and B3 are used, which are connected via belts 45, 46 to a tool spindle 42, as shown in FIG. 10, for example. The drive B1 drives a belt pulley 46.1, which is connected to a spindle body 42.1, by means of the belt 46. The drive B1 sets the belt pulley 46.1 and therefore also the spindle body 42.1 into rotation around a rotational axis R1 via the belt 46. The drive B3 drives a belt pulley 45.1, which is connected to an eccentric bush 47, by means of the belt 45. It is an advantage of the configuration having two belts 45, 46 that the tool spindle 42 can be mounted so it is movable in the device 20, and the belts 45, 46 compensate for the small eccentric movements The configurations according to a) and b) can be combined as follows.

c) The eccentric drive B3 is seated directly on the tool spindle 42 and the drive B1 has a drive connection (similarly to FIG. 10) via a belt 46 and a belt pulley 46.1 to the drive body 42.1. The eccentric drive B3 can have a direct drive connection to an eccentric bush 47.

d) Alternatively, the drive B1 is seated directly on the tool spindle 42 and the eccentric drive B3 has a drive connection (similarly to FIG. 10) via a belt 45 and a belt pulley 45.1 to the eccentric bush 47.

In either case, the drives B1, B3 are controlled by the CNC controller 50, in order to cause the desired superposition of the rotational movement around the rotational axis R1 and the eccentric movement by way of an interaction with respect to time.

In some embodiments. the interaction with respect to time of the drives B1, B3 is brought about by the CNC controller 50 such that the speed n1 and n3 and the relative angle are specified and controlled. In this case, n1 is the main speed and n3 is the speed of the eccentricity. Alternatively to the speeds n1 and n3, the speed ratio DV=n3/n1 can also be specified.

Accordingly, the tool spindle 42 or the spindle body 42.1 including tool adapter 42.2, respectively, execute a rotational movement around the rotational axis R1 having the main speed n1. The following condition applies: $\omega 1 = 2\pi n\,1$. If the speed n3 of the drive B3 is now set to n3 =n1 (DV=1=EV), because of the eccentric mounting of the spindle body 42.1 in the eccentric bush 47, one eccentric stroke then results per full revolution of the tool spindle 42 or the grinding wheel 24 chucked therein. If the speed n3 of the drive B3 is now set to n3=2*n1 (DV=2=EV), two eccentric strokes result per full revolution. The speed ratio DV corresponds to the eccentric ratio EV and specifies the number of the eccentric strokes per full revolution.

Figure 8:
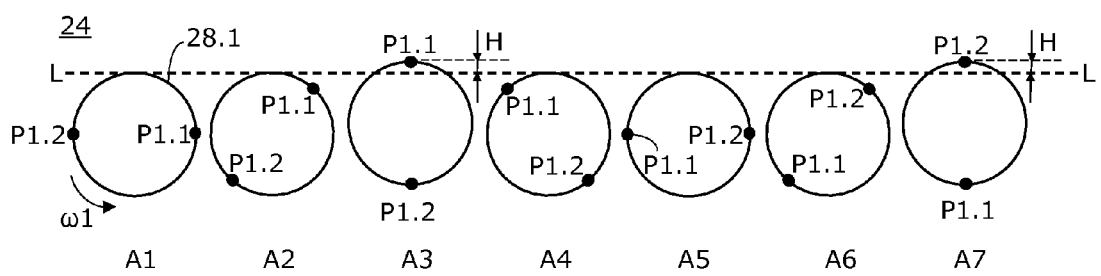
FIG. 8 is a schematic series of instantaneous views A1 to A7 of an electrically mounted grinding wheel, which has two contact points for use in one-flank cutting (the circular eccentric movement is replaced here by a simple up-and-down movement)

The relative angle can be specified or set in order to ensure that the eccentric strokes always occur at the desired points in relation to the chucked grinding wheel 24. With respect to the schematic illustrations A1-A7 of FIG. 8, for example, this means that the eccentric stroke can occur when the contact points P1.1 and P1.2 of the grinding wheel 24 reach the spatially-fixed 12 o'clock position. FIG. 8 shows, as do FIGS. 4A and 4B, only the outer surface 28.1 of the grinding wheel 24 represented by a circle. In addition, it is to be noted that the illustration of FIG. 8 was intentionally simplified, in that the circular eccentric movement was replaced by a simple up-and-down movement. In reality, the circle 28.1 shown would execute a slightly circular movement, as explained in conjunction with FIG. 1A.

Only the contact points of the outer surface 28.1 are also considered here. The speed n3 of the drive B3 is set to n3=2n1 (DV=2=EV), so that two eccentric strokes result per full revolution. In addition, the relative angle was specified in this example such that the eccentric strokes occur at the spatially-fixed 12 o'clock position.

In FIG. 8, the maximum stroke H is shown, which can be considered to be a measure of the displacement of the contact points of the outer periphery or the outer surface 28.1 of the grinding disc 24, respectively. The stroke H does not necessarily have to be identical to the distance e. If the eccentric strokes are achieved by a circular parallel displacement/movement of the rotational axis R1, then accordingly H=e.

In some embodiments, the grinding wheel 24 is subdivided (virtually or actually) into angular sections. These sections could also have different compositions. Thus, the grinding wheel 24 can have sections which have material having higher removal rate for roughing, for example. Other sections of the grinding wheel 24 can be coated with material for achieving surfaces having higher surface quality, for example. In the case of the subdivision into angular sections, it is taken into consideration that a contact point is a circular arc segment (i.e., a contact region) in practice, which comes into contact with the material of the work piece 31. Solely point contacts are only theoretically possible.

The larger the diameter of the grinding wheel 24 and the further away the contact points and the circular arc segments (contact regions) thus established from the rotational axis R1, the more circular arc segments can be arranged on the annular 360° full periphery (U1=2πr1). This principle will be explained on the basis of FIG. 5. FIG. 5 shows a view of the cup side of a grinding wheel 24. The grinding wheel 24 has an external diameter which is 2*r. The internal diameter of the profile 28 is 2*r1 and is represented by a circle K1. The outer surface 28.1, the inner surface 28.2, and the head surface 28.3 of the profile 28 can be seen in FIG. 5. The outer surface 28.1, the head surface 28.3, and the inner surface 28.2 are located viewed from the outside to the inside. The head surface 28.3 is in the plane of the drawing here and the outer surface 28.1 and the inner surface 28.2 are inclined (conical).

Contact points P1.1 and P1.2 are shown in FIG. 5, which all lie on a circle K1, having a radius r1, which is smaller than the radius r. It is assumed that the grinding wheel 24 is designed for the one-flank cutting of the convex tooth flanks 5.2 of a work piece 31.

It can also be inferred from FIG. 5 that the angular distance of two adjacent contact points P1.1, P1.2 corresponds to the absolute value of the angle $\phi 1$, which is assigned to the circular arc length s1, if the circular arc segments S1 and S2 seamlessly adjoin one another and if the circular arc segments S1 and S2 are each of equal length.

In addition, a periodicity can be maintained upon the establishment of the contact points or the associated angular positions, respectively, since the eccentric movement is a cyclic movement. It can only be ensured that the same positions of the grinding wheel 24 are encountered again and again as contact points even after a plurality of revolutions if the periodicity is provided with respect to a full revolution.

The device 20 is configured such that the following procedure is used in the establishment of the contact points. A required circular arc length s1 of the circular arc segment S1 results from the processing parameters, for example, s1=1 cm. The diameter or radius r1 of the circle K1 is known (specified by the tool 24). In addition, the angular resolution $\Delta\phi$min of the device 20 is known. It is assumed here that the angular resolution $\Delta\phi$min=1°. Theoretically, 360 contact points could be housed on a full circle at the cited angular resolution. At the predefined length s1=1 cm, the periphery U1 of the circle K1 would have to be at least 360 cm in order to house 360, 1 cm long circular arc segments. The radius r1 of such a circle K1 would be 57.3 cm.

A subdivision of a given grinding wheel 24 into a suitable number of circular arc segments can be performed based on corresponding circular arc and angle calculations. For example, if 36 circular arc segments each having a circular arc length s1 of 2 cm (i.e., the required minimum circular arc length is s1=2 cm) are to be housed on a grinding wheel, the circle K1 requires a radius r1 of at least 11.46 cm. If one takes a radius r1=12 cm, for example, in order to house the 36 circular arc segments of 2 cm each, an effective circular arc length of 2.09 cm results. This effective circular arc length of 2.09 cm is greater than the required circular arc length of 2 cm. The feature that the circular arc length can be at least 2 cm is therefore fulfilled. If the device 20 has an angular resolution of 1°, it can now be checked whether the subdivision of the full circle into 36 circular arc segments is possible. Each of the 36 circular arc segments covers an angle $\phi 1$ of 10°. The angle $\phi 1$ can be integrally divided by the angular resolution of 1°. This means that the central contact points of the 36 circular arc segments can be reproducibly set and approached precisely and periodically.

A subdivision of a grinding tool 24 into 4, 5, 6, 8, 9, 10, 12, 15, 18, 20, 24, 30, 36, 40, etc., is particularly suitable if an angular resolution $\Delta\phi$min of 1° is specified. In practice, in most cases there are rather fewer subdivisions than listed above as examples. If an angular resolution $\Delta\phi$min of 0.5° is specified, further numbers such as 16 are added, to give an additional example.

The angular distance $\Delta\phi$ is greater than or equal to $\Delta\phi$min. In addition, the numbers n and m can be integers greater than 2 and the selected number n or m should, when multiplied with $\Delta\phi$min, result in the value 360° or an integral divisor of 360°. In addition, it is always to be ensured that the effective calculated length of the circular arc segments is greater than the minimum circular arc length s1 required based on processing parameters. If this last condition is fulfilled, there is always a small angular distance as a safety distance or reserve between adjacent circular arc segments.

However, it is also possible to incorporate a margin in the minimum circular arc length S1 required based on processing parameters, in order to thus ensure a sufficient spatial (angular) distance. Thus, if the required minimum circular arc length s1 is 1.5 cm, for example, this value can be rounded up to 2 cm, for example. If the above-described calculations are carried out using the value of 2 cm, for example, a mutual angular distance of adjacent circular arc segments or contact points which offers sufficient safety distance or reserve is always achieved.

In some embodiments, the grinding wheel 24 is subdivided into an integer number of circular arc segments S1, S2, etc. of the outer surface 28.1 and/or the inner surface 28.2 and the CNC controller 50 controls the eccentric movement such that all contact points P1.1, P1.2, P2.1, P2.2 respectively lie within the circular arc segments S1, S2 at angular positions which can be specified at the machine (in the meaning of settable and approachable). The angular positions which can be specified at the machine are dependent on the system-side angular resolution $\Delta\phi$min. The angular positions which can be specified at the machine can be integrally divisible by the angular resolution $\Delta\phi$min.

Figure 6:
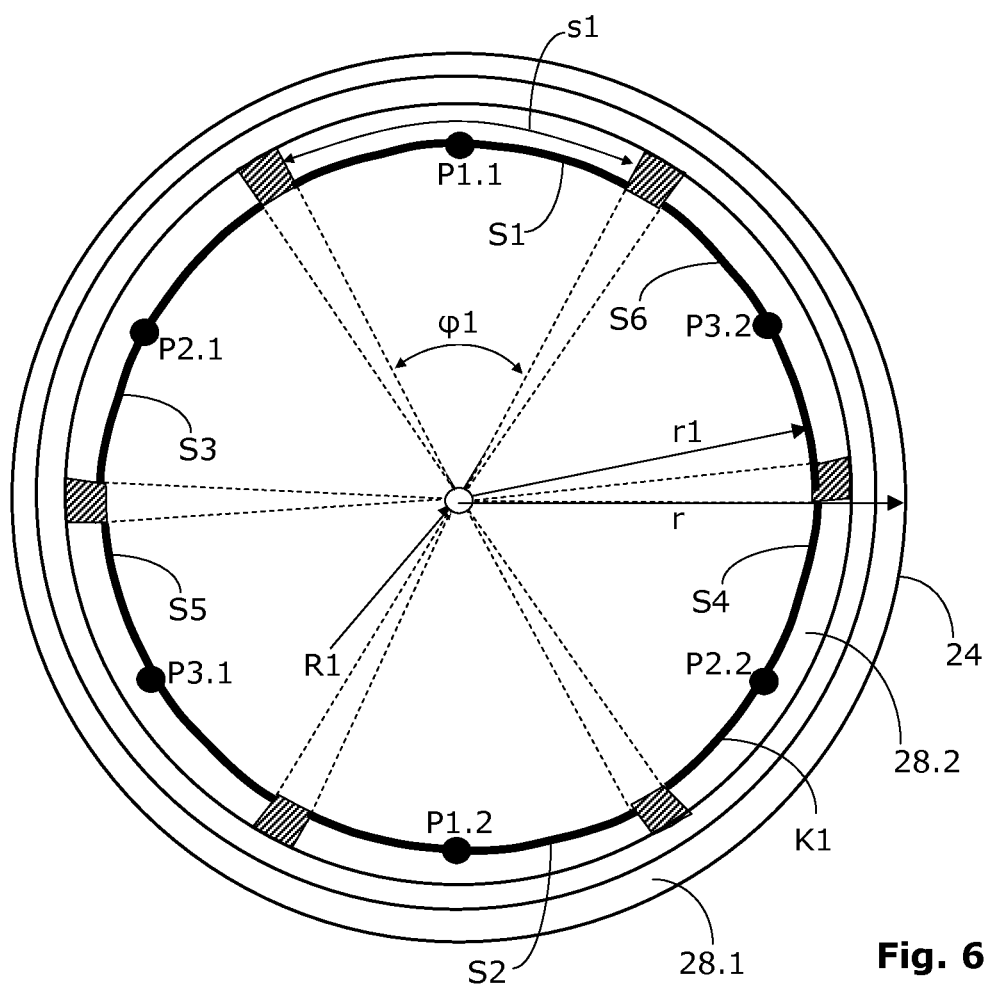
FIG. 6 is a schematic front view of the cup side of an eccentrically mounted grinding wheel, which is divided into six circular segments, each having one (stroke) point, wherein the circular segments are spaced apart from one another.

FIG. 6 shows an example of a grinding wheel 24 whose inner surface 28.2 is subdivided into six circular arc segments S1-S6. The circular arc segments S1-S6 are shown as bold circular arcs of the circle K1 having the radius r1. They are distributed equidistantly over the full circle. A contact point P1.1 to P3.2 is seated in the angular center of each circular arc segment S1-S6. Each circular arc segment has a circular arc length s1, which is somewhat shorter than the full circumference of 360° divided by the number of the circular arc segments. Intermediate spaces, which are shown shaded here, thus result between the six circular arc segments S1-S6. This means that the six circular arc segments S1-S6 do not overlap or run into one another, but rather are twisted by a few degrees in relation to one another.

This grinding wheel 24 according to FIG. 6 can be used as follows in a machine 20 of the invention, for example. One-flank cutting is presumed hereafter, in which only the peripheral inner surface 28.2 of the grinding wheel 24 is used. In a first machining phase (I phase), for example, the contact points P1.1 and P1.2 can respectively produce contact with the material of the work piece 31. The condition n=2 applies here, which means that two contacts on the inner surface 28.2 occur per full revolution of the grinding wheel 24. In a second machining phase (II phase), for example, the contact points P2.1 and P2.2 can respectively produce contact with the material of the work piece 31. The condition m=2 applies here. In still a further machining phase, for example, the contact points P3.1 and P3.2 can respectively produce contact with the material of the work piece 31. The condition k=2 applies here.

The invention permits an expansion, since a subdivision/segmenting of the grinding wheel 24 occurs quasi-virtually. This subdivision is performed such that the contact points within the segments can repeatedly be approached with angular precision. The virtual subdivision/segmenting of the grinding wheel 24 allows a physical partition of circular segments of the abrasive outer surface 28.1 and/or inner surface 28.2 of the grinding wheel 24 into roughing regions and finishing regions, for example.

Figure 7:
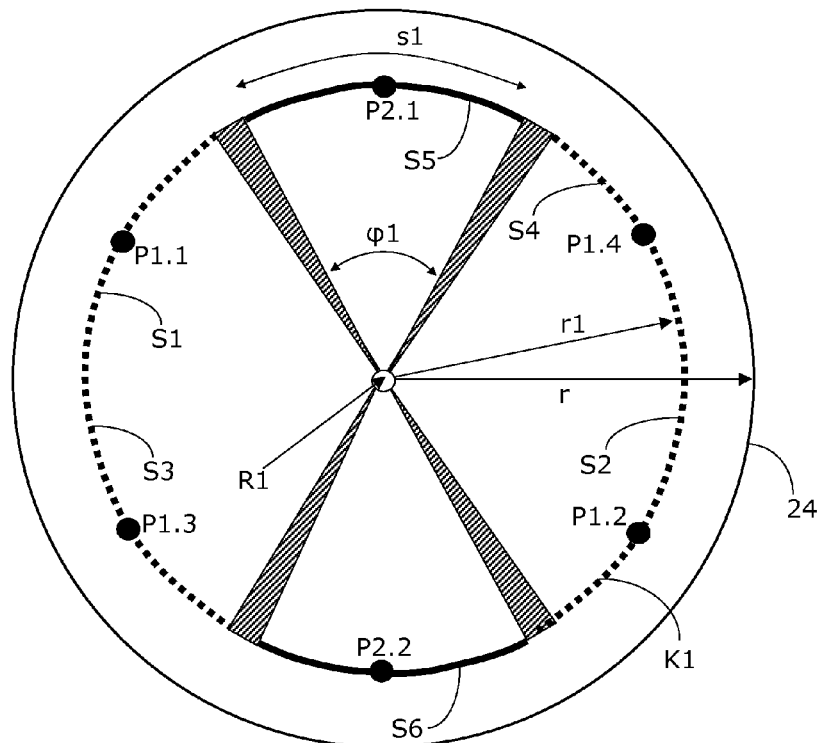
FIG. 7 is a schematic front view of the cup side of an eccentrically mounted grinding wheel, which is divided into a plurality of circular segments for roughing and finishing.

The principle shown in FIG. 6 can therefore be refined as follows. Since more material is to be removed on the work piece 31 during the roughing, in the example shown the roughing is assigned a larger surface region of the grinding wheel 24. A corresponding example of a grinding tool 24 is shown in FIG. 7, where only the circle K1 having the radius r1 is shown in the schematic illustration of the tooth profile 28 of the grinding wheel 24. The grinding wheel 24 has two large circular segments approximately between 7 o'clock and 11 o'clock and between 2 o'clock and 5 o'clock. The corresponding circular arc segments are identified with S1, S2, S3, and S4. Each of these circular arc segments S1-S4 is assigned a contact point P1.1 to P1.4. The circular arc segments S1-S4 are illustrated here by a bold dotted curve, because these circular arc segments S1-S4 of the grinding wheel 24 are designed for roughing, i.e., the corresponding sections of the outer surface 28.1 and/or inner surface 28.2 are designed for roughing. The two remaining circular arc segments S5 and S6 are represented by corresponding bold solid curves. The two contact points P2.1 and P2.2 are assigned to these two circular arc segments S5 and S6. The circular arc segments S5 and S6 are used for the finishing, i.e., the corresponding sections of the outer surface 28.1 and/or inner surface 28.2 are designed for finishing. The circular arc segments S5 and S6, or the sections of the outer surface 28.1 and/or inner surface 28.2, respectively, can be coated with a different grain for the finishing than the circular arc segments S1-S4 or the corresponding sections. The shaded segments between the mentioned segments are used as a safety distance or reserve, as described above.

It is to be noted here that the shaded segments of the grinding wheel 24 do not have to be physically present on the tool. These are rather virtual intermediate or transition segments. In some embodiments, the intermediate or transition segments of the grinding wheel 24 are not visible. If needed, the intermediate or transition segments can be identified on the grinding wheel 24 (for example, by color), however.

The grinding wheel 24 according to FIG. 7 can be used as follows, for example. In a first phase (I phase) a work piece 31 is subjected to roughing using the contact points P1.1 and P1.2 (the condition n=2 applies here). After the roughing, the roughed tooth flanks of the work piece 31 can be subjected to finishing. During the finishing, the contact points P2.1 and P2.2 are used. In a further step (for example, again in a first phase on another work piece 31), this further work piece 31 is subjected to roughing using the contact points P1.3 and P1.4 (the condition k=2 applies here). After the roughing of this further work piece 31, the roughed tooth flanks can be subjected to finishing. During the finishing, the same contact points P2.1 and P2.2 are used as previously.

FIG. 8 shows a series of instantaneous views A1 to A7 of a grinding wheel 24, which is eccentrically mounted and according to the invention has two contact points P1.1 and P1.2 on the outer surface 28.1 (EV=2). The circular eccentric movement is shown in simplified form here in FIG. 8 by a linear up-and-down movement. A dashed line L shows the normal position of the upper edge (on the outermost periphery) of the grinding wheel 24. The work piece 31 to be machined is intentionally not shown in FIG. 8. The grinding wheel 24 rotates counterclockwise, as indicated in the instantaneous view A1 by the arrow ω1. The instantaneous view A1 shows a situation in which the two contact points P1.1 and P1.2 of the grinding wheel 24 lie in a spatially-fixed coordinate system at 3 o'clock and 9 o'clock. The grinding wheel 24 now rotates by −45°, in order to reach the position which is shown in instantaneous view A2. The grinding wheel 24 now rotates by a further −45°, in order to reach the position which is shown in instantaneous view A3. At the moment where the contact point P1.1 reaches the 12 o'clock position, the tool spindle 42 makes a stroke movement (also called an eccentric movement) in solidarity with the grinding wheel 24. Through the linear stroke movement shown in simplified form here, the grinding wheel 24 is displaced upward temporarily by a stroke H. A part of the grinding wheel 24 now lies above the line L in the instantaneous view A3. After a further −45° rotation, the grinding wheel 24 reaches the position which is shown in the instantaneous view A4. It is now again under the line L at latest upon reaching the position shown in the instantaneous view A4. The grinding wheel 24 accordingly rotates further and reaches the positions which are shown in the instantaneous views A5 and A6. At the moment where the contact point P1.2 reaches the 12 o'clock position, the tool spindle 42 again makes a stroke movement (also called an eccentric movement) in solidarity with the grinding wheel 24. The grinding wheel 24 is displaced temporarily upward by a stroke H by the stroke movement. A part of the grinding wheel 24 is now above the line L in the instantaneous view A7. This exemplary sequence is repeated thusly or in another form in all embodiments periodically, i.e., cyclically (regularly reoccurring).

FIG. 9 shows a side view of a grinding wheel 24 in the form of a cup grinding wheel, which is eccentrically mounted and has a plurality of contact points on the outer surface 28.1 and/or on the inner surface 28.2 (not visible in FIG. 9). In the side view, two of the contact points P1.1 and P2.1 of the outer surface 28.1 are visible. The contact point P1.1 is active in the machining phase shown and is therefore represented as a solid black circle (as also in FIG. 4A). The contact point P2.1 is inactive in the machining phase shown and is therefore represented as an empty triangle.

FIG. 10 shows a sectional view of an exemplary tool spindle 42, which can be driven via two belts 45, 46 and belt pulleys 45.1, 46.1. Viewed from the inside to the outside, such a tool spindle 42 can comprise a spindle body 42.1, which has a continuous central borehole 48 here. The spindle body 42.1 is set into rotation around the rotational axis R1 by the belt pulley 46.1 and the belt 46. The spindle body 42.1 is mounted by means of spindle bearings 49.1 in an eccentric bush 47. The eccentric bush 47 is in turn mounted by means of eccentric bearings 49.2 in an outer spindle body 41. The outer spindle body 41 is set into a cyclic rotational movement around the virtual rotational axis of the eccentrically mounted bush 47 by the belt pulley 45.1 and the belt 45. These two rotational movements are superimposed and result in the desired periodic stroke movements of the spindle body 42.1 together with the grinding tool 24 fastened thereon, which is schematically shown in FIG. 10.

The above described invention is usable, for example, in the case of discontinuous (plunge) grinding of bevel gears and of (spiral-toothed) crown wheels. Depending on the application, either the condition n≠m or the condition n=m can apply.

As may be recognized by those of ordinary skill in the pertinent art based on the teachings herein, numerous changes and modifications can be made to the above-described and other embodiments of the present invention without departing from the scope of the invention as defined in the appended claims. Accordingly, this detailed description of embodiments is to be taken in an illustrative, as opposed to a limiting sense.

What is claimed is:
1. A device for machining a bevel gear comprising:
a work piece spindle adapted to secure a bevel gear work piece, a tool spindle, a grinding wheel having an abrasive surface rotatably attached to the tool spindle, and a plurality of drives operatively controlled by a CNC controller for CNC-controlled machining of the bevel gear work piece, wherein:

the grinding wheel is configured to rotate about a rotational axis of the tool spindle, engage the bevel gear work piece and remove material therefrom;

the device is configured to superimpose said rotation with an eccentric movement, such that the grinding wheel engages the bevel gear work piece only at n contact regions along a full circle of the abrasive surface in a first machining phase, and the device is configured to adjust said eccentric movement, such that after said first machining phase, the grinding wheel engages the bevel gear work piece in a further machining phase at only m contact regions along the full circle of the abrasive surface that do not overlap with the n contact regions.

2. A device as defined in claim 1, wherein the n contact regions are angularly spaced from the m contact regions by an angular distance $\Delta\phi$, such that the n and m contact regions do not overlap.

3. A device as defined in claim 2, wherein the number of n contact regions is equal to the number of m contact regions.

4. A device as defined in claim 1, wherein the tool spindle is an eccentric tool spindle having fixable stroke points relative to the grinding wheel.

5. A device as defined in claim 1, further comprising a CNC controller configured to CNC-control machine the bevel gear work piece and rotate the grinding wheel by a distance after the first machining phase and prior to the further machining phase.

6. A device as defined in claim 5, wherein the distance is an angular distance $\Delta\phi$.

7. A device as defined in claim 1, wherein the number of n contact regions is different from the number of m contact regions.

8. A device as defined in claim 1, wherein the grinding wheel is subdivided into an integral number of circular arc segments on a control side thereof, and a CNC-controller controls eccentric movement such that the m and n contact regions are located within the circular arc segments at angular positions specifiable by said controller.

9. A device as defined in claim 1, wherein the grinding wheel is subdivided into an integral number of circular arc segments, and at least one of said circular arc segments is configured for roughing and at least one other of said circular arc segments is configured for finishing.

10. A device as defined in claim 1, wherein the plurality of drives comprises two drives arranged coaxially with respect to one another on the rotational axis and mechanically connected to the tool spindle.

11. A device as defined in claim 10, further comprising belts adapted to mechanically connect the tool spindle to the two drives.

12. A device as defined in claim 1, further comprising a CNC controller adapted to specify at least one of (i) speed and (ii) speed ratio of the rotation of the tool spindle around the rotational axis and of the eccentric movement.

13. A device as defined in claim 1, further comprising a CNC controller adapted to specify (i) a relative angular position of the tool spindle and (ii) eccentric position.

14. A method for machining bevel gear work pieces using a grinding wheel having an abrasive surface, comprising the following steps:

attaching a grinding wheel with an abrasive surface to a tool spindle, mounting a first bevel gear work piece on a work piece spindle, rotating the grinding wheel about a rotational axis of the tool spindle;

grinding machining the first bevel gear work piece with the grinding wheel while superimposing an eccentric movement on the rotation of the grinding wheel such that the abrasive surface only engages the material of the bevel gear work piece at n contact regions along a full circle of the abrasive surface, and further including controlling said machining with a CNC-controller; and further grinding machining the first bevel gear work piece or another bevel gear work piece while superimposing an eccentric movement on the rotation of the grinding wheel such that the abrasive surface only engages the material of the bevel gear work piece at m contact regions of the full circle of the bevel gear work piece, wherein the m contact regions are spatially spaced apart from the n contact regions, and further including controlling said further machining with a CNC-controller.

15. A method as defined in claim 14, wherein the grinding machining step is a roughing machining and the further grinding machining step is a finishing machining.

16. A method as defined in claim 14 including performing said steps with a grinding machine having a CNC-controller adapted to set at least one of the number of n contact regions, the number of m contact regions, the number of circular segments of the grinding wheel, a minimum circular arc length of said circular segments, and a minimum distance between adjacent circular segments.

17. A method as defined in claim 14 including performing said steps with a grinding machine having a CNC-controller adapted to set at least one of (i) speed and (ii) speed ratio of the rotation of the tool spindle about the rotational axis and of the eccentric movement.

18. A method as defined in claim 14 including performing said steps with a grinding machine having a CNC-controller adapted to set at least one of (i) relative angular position of the tool spindle and (i) eccentric position.

* * * * *

UNITED STATES PATENT AND TRADEMARK OFFICE
CERTIFICATE OF CORRECTION

| | |
|---|---|
| PATENT NO. | : 9,180,536 B2 |
| APPLICATION NO. | : 13/855618 |
| DATED | : November 10, 2015 |
| INVENTOR(S) | : Alexander Dürr |

It is certified that error appears in the above-identified patent and that said Letters Patent is hereby corrected as shown below:

In The Claims

At column 15, claim 2, line 20, please delete the phrase "angular distance AΦ" and replace with the phrase "angular distance ΔΦ".

Signed and Sealed this
Twelfth Day of April, 2016

Michelle K. Lee
*Director of the United States Patent and Trademark Office*